United States Patent [19]

Robinson

[11] Patent Number: 4,709,326

[45] Date of Patent: Nov. 24, 1987

[54] GENERAL LOCKING/SYNCHRONIZATION FACILITY WITH CANONICAL STATES AND MAPPING OF PROCESSORS

[75] Inventor: John T. Robinson, Yorktown Heights, N.Y.

[73] Assignee: International Business Machines Corporation, Armonk, N.Y.

[21] Appl. No.: 626,163

[22] Filed: Jun. 29, 1984

[51] Int. Cl.⁴ ............................................. G06F 13/14
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,037,214 | 7/1977 | Birney | 364/200 |
| 4,245,306 | 1/1981 | Besemer | 364/200 |
| 4,249,241 | 2/1981 | Aberle | 364/200 |
| 4,408,273 | 10/1983 | Plow | 364/200 |
| 4,480,304 | 10/1984 | Carr | 364/200 |

Primary Examiner—Gary V. Harkcom
Assistant Examiner—Lawrence E. Anderson
Attorney, Agent, or Firm—Sughrue, Mion, Zinn, Macpeak, and Seas

[57] ABSTRACT

The transition table size and table-driven locking facilities if reduced by decomposing lock states into canonical states and canonical-actual maps, mapping actual processors to canonical processors, looking up a transition in a table which contains a new canonical state, notify bits and a canonical-canonical map, permuting the canonical-actual map using the canonical-canonical map, and permuting the notify bits using the original canonical-actual map.

8 Claims, 12 Drawing Figures

FIG. 1

REQUESTS

R1: UNLOCK     R2: LOCK-EXCLUSIVE     R3: LOCK-SHARE

CANONICAL STATES

| | | | |
|---|---|---|---|
| CS0: UL | CS1: XA | CS2: SA | CS3: XB→XA |
| CS4: SB→XA | CS5: XB→SA | CS6: SAB | CS7: XC→XB→XA |
| CS8: SC→XB→XA | CS9: XC→SB→XA | CS10: SBC→XA | CS11: XC→XB→SA |
| CS12: SC→XB→SA | CS13: XC→SAB | CS14: SABC | CS15: XD→XC→XB→XA |
| CS16: SD→XC→XB→XA | CS17: XD→SC→XB→XA | CS18: SCD→XB→XA | CS19: XD→XC→SB→XA |
| CS20: SD→XC→SB→XA | CS21: XD→SBC→XA | CS22: SBCD→XA | CS23: XD→XC→XB→SA |
| CS24: SD→XC→XB→SA | CS25: XD→SC→XB→SA | CS26: SCD→XB→SA | CS27: XD→XC→SAB |
| CS28: SD→XC→SAB | CS29: XD→SABC | CS30: SABCD | |

FIG. 2A

| CSi | CAM | | | |
|---|---|---|---|---|
| 12 | 4 | 1 | 3 | 2 |

FIG. 2B

| CSi' | CCM | | | |
|---|---|---|---|---|
| 4 | B | C | A | D |

FIG. 2C

| CSi' | CAM' | | | |
|---|---|---|---|---|
| 4 | 1 | 3 | 4 | 2 |

FIG. 3A

| 0 1 2 | 3 4 5 6 7 | 8 9 | 10 11 | 12 13 | 14 15 |
|---|---|---|---|---|---|
| UNUSED | CAN. STATE | CAM [0] | CAM [1] | CAM [2] | CAM [3] |

FIG. 3B

| 0 1 2 | 3 | 4 | 5 | 6 | 7 | 8 | 9 | 10 | 11 | 12 | 13 | 14 | 15 |
|---|---|---|---|---|---|---|---|---|---|---|---|---|---|
| UNUSED | 0 | 1 | 1 | 0 | 0 | 1 | 1 | 0 | 0 | 1 | 0 | 0 | 1 |

FIG. 3C

CCM

| 0 | 1 | 2 | 3 | 4 | 5 | 6 | 7 |
|---|---|---|---|---|---|---|---|
| 0 | 1 | 1 | 0 | 0 | 0 | 1 | 1 |

FIG. 3D

| 0 1 2 | 3 | 4 | 5 | 6 | 7 | 8 | 9 | 10 | 11 | 12 | 13 | 14 | 15 |
|---|---|---|---|---|---|---|---|---|---|---|---|---|---|
| UNUSED | 0 | 0 | 1 | 0 | 0 | 0 | 0 | 1 | 0 | 1 | 1 | 0 | 1 |

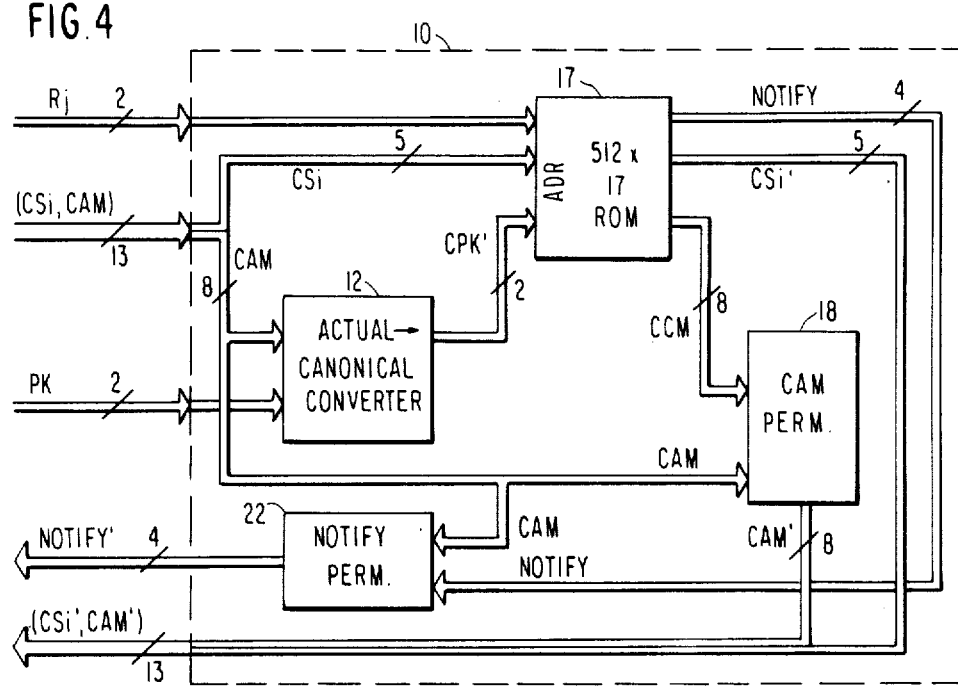
FIG. 4
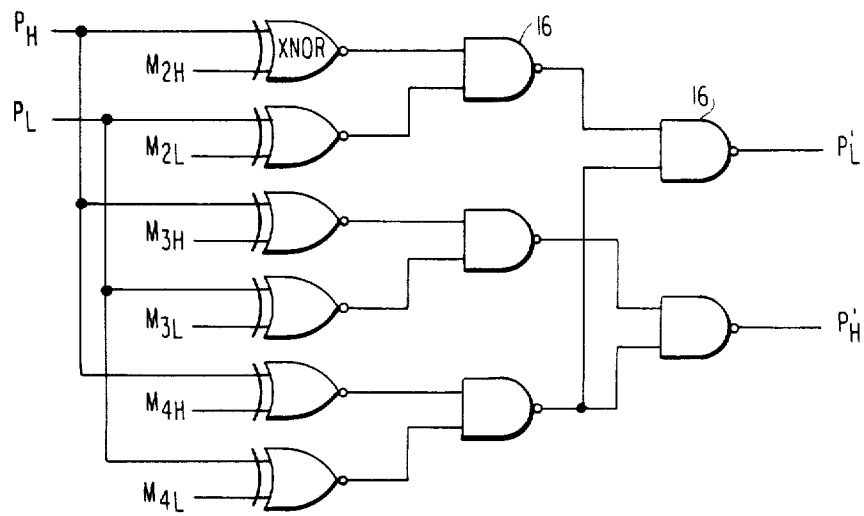
FIG. 5    ACTUAL → CANONICAL CONVERTER
INPUTS: $M_{2H}, M_{2L}, M_{3H}, M_{3L}, M_{4H}, M_{4L}$ (CAM)
$P_H, P_L$ (ACTUAL PROC.)
OUTPUTS: $P'_H, P'_L$ (CAN. PROC.)

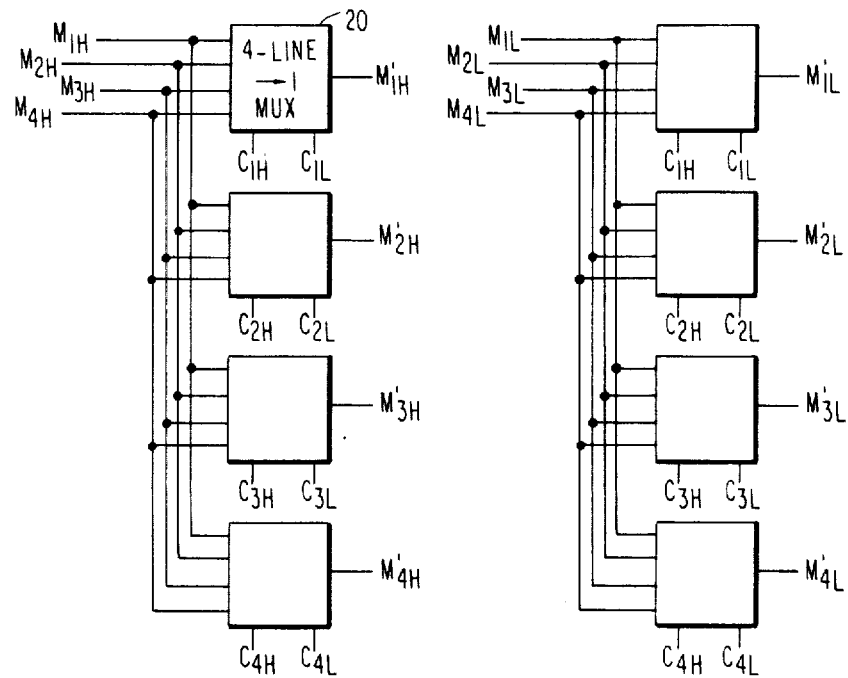
FIG. 6 CAM PERMUTATION
INPUTS: $M_{1H}, M_{1L}, M_{2H}, M_{2L}, M_{3H}, M_{3L}, M_{4H}, M_{4L}$ (CAM)
$C_{1H}, C_{1L}, C_{2H}, C_{2L}, C_{3H}, C_{3L}, C_{4H}, C_{4L}$ (CCM)
OUTPUTS: $M'_{1H}, M'_{1L}, M'_{2H}, M'_{2L}, M'_{3H}, M'_{3L}, M'_{4H}, M'_{4L}$ (CAM')
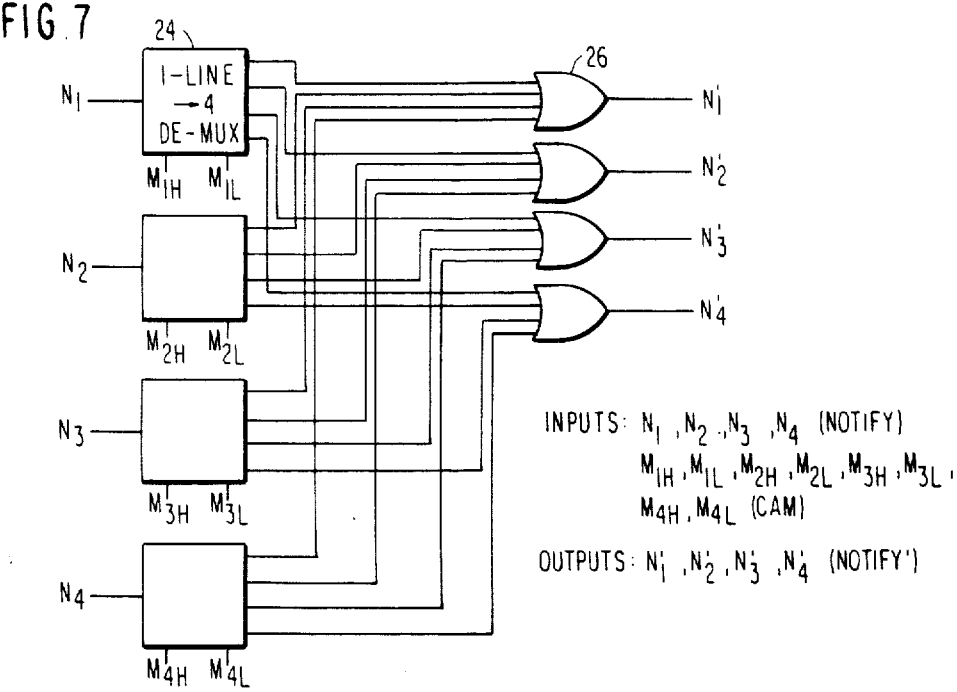
FIG. 7
INPUTS: $N_1, N_2, N_3, N_4$ (NOTIFY)
$M_{1H}, M_{1L}, M_{2H}, M_{2L}, M_{3H}, M_{3L}, M_{4H}, M_{4L}$ (CAM)
OUTPUTS: $N'_1, N'_2, N'_3, N'_4$ (NOTIFY')

GENERAL LOCKING/SYNCHRONIZATION FACILITY WITH CANONICAL STATES AND MAPPING OF PROCESSORS

BACKGROUND OF THE INVENTION

In multiprocessor systems (both tightly and loosely coupled), it is necessary to control the accesses of the processors to shared data or shared functions or resources. A facility providing the necessary control mechanism is called a "locking" or "synchronization" facility. Since the locking/synchronization facility must be available to all processors in the system, it is often the case that the facility must run on special-purpose hardware that supports communication with all of the processors. The result is that development costs for such a facility can be very high.

A solution to this problem is to design "general" locking/synchronization facilities that can be easily modified or extended, and that can be tailored to particular applications. One way to provide such a facility is to encode all state transitions of the locks or synchronization entities in a transition table. For example, assume that each lock or synchronization entity L can be in one of n states, S1-Sn, and that each of the p processors P1-Pp can issue any of r requests R1-Rr against L. The state-transition behavior of the locking/synchronization facility can then be specified by a transition table T consisting of s·p·r entries, where each entry T[i,j,k] gives the new state of a lock currently in the state Si when request Rj is made by processor Pk.

A simple example of a transition table is given below in Table I for a system employing p=2 processors and having exclusive locks with three states: S1=unlocked, S2=locked-by-P1 and S3=locked-by-P2, with the available requests comprising R1=lock and R2=unlocked.

TABLE I

| Si | Rj | Pk | T[i,j,k] |
|---|---|---|---|
| unlocked | unlock | P1 | unlocked |
| unlocked | unlock | P2 | unlocked |
| unlocked | lock | P1 | locked-by-P1 |
| unlocked | lock | P2 | locked-by-P2 |
| locked-by-P1 | unlock | P1 | unlocked |
| locked-by-P1 | unlock | P2 | locked-by-P1 |
| locked-by-P1 | lock | P1 | locked-by-P1 |
| locked-by-P1 | lock | P2 | locked-by-P1 |
| locked-by-P2 | unlock | P1 | locked-by-P2 |
| locked-by-P2 | unlock | P2 | unlocked |
| locked-by-P2 | lock | P1 | locked-by-P2 |
| locked-by-P2 | lock | P2 | locked-by-P2 |

As locks change states, certain processors may be interested in the transition, depending on the state change. In particular, it is usually the case that a processor is interested in the result of a lock request that it has just issued. The details of the communication of the lock name and new lock state to interested processors depend on the hardware that is being used to support the locking/synchronization facility. Also, it may be the case that this information is buffered. Here it will simply be assumed that it is possible to transmit this information to all interested processors. In order to determine which processors are interested in a particular transition, a boolean "notify vector" N[i,j,k] will be associated with each transition table entry T[i,j,k].

For example, a simple notify vector N[i,j,k] could be a k-bit vector with one bit corresponding to each of the k processors and the value of each bit indicating whether or not the corresponding processor should be notified for the particular state transition. Thus, if N[i,j,k][k'], $1 \leq k' \leq k$, lock name L and new state T[i,j,k] will be sent to processor Pk' (or put into a buffer for processor Pk') when processor Pk issues request Rj against a lock L currently in state Si.

For example, it may be desired to extend the exclusive lock facility described above in Table I to include two new states: S4=locked-by-P1-P2-waiting and S5=locked-by-P2-P1-waiting. It may be further desired that: (1) if a lock is held by one of the processors and the other goes into a wait on the lock, the first processor will be notified; (2) if a processor, e.g., P1, is waiting for a lock held by P2, the lock state will become locked-by-P1 when P2 releases the lock, and P1 will be notified; and (3) P1 and P2 are always interested in the results of their own lock requests. With these assumptions, T and N would be as shown below in Table II.

TABLE II

| Si | Rj | Pk | T[i,j,k] | N[i,j,k] |
|---|---|---|---|---|
| unlocked | unlock | P1 | unlocked | 1,0 |
| unlocked | unlock | P2 | unlocked | 0,1 |
| unlocked | lock | P1 | locked-by-P1 | 1,0 |
| unlocked | lock | P2 | locked-by-P2 | 0,1 |
| locked-by-P1 | unlock | P1 | unlocked | 1,0 |
| locked-by-P1 | unlock | P2 | locked-by-P1 | 0,1 |
| locked-by-P1 | lock | P1 | locked-by-P1 | 1,0 |
| locked-by-P1 | lock | P2 | lckd-by-P1-P2-wait | 1,1 |
| locked-by-P2 | unlock | P1 | locked-by-P2 | 1,0 |
| locked-by-P2 | unlock | P2 | unlocked | 0,1 |
| locked-by-P2 | lock | P1 | lckd-by-P2-P1-wait | 1,1 |
| locked-by-P2 | lock | P2 | locked-by-P2 | 0,1 |
| lckd-by-P1-P2-wait | unlock | P1 | locked-by-P2 | 1,1 |
| lckd-by-P1-P2-wait | unlock | P2 | locked-by-P1 | 0,1 |
| lckd-by-P1-P2-wait | lock | P1 | lckd-by-P1-P2-wait | 1,0 |
| lckd-by-P1-P2-wait | lock | P2 | lckd-by-P1-P2-wait | 0,1 |
| lckd-by-P2-P1-wait | unlock | P1 | locked-by-P2 | 1,0 |
| lckd-by-P2-P1-wait | unlock | P2 | locked-by-P1 | 1,1 |
| lckd-by-P2-P1-wait | lock | P1 | lckd-by-P2-P1-wait | 1,0 |
| lckd-by-P2-P1-wait | lock | P2 | lckd-by-P2-P1-wait | 0,1 |

In summary, a straight forward locking/synchronization facility using conventional table-driven techniques would operate as follows:

1. A request Rj against the lock L is received from processor Pk.
2. The system looks up the current state of lock L, e.g., Si.
3. The state of L is set to T[i,j,k].
4. For $1 \leq k' \leq p$, if N[i,j,k][k'], then (L,T[i,j,k]) will be sent to processor Pk'.

If it were desired to extend the exclusive lock facility with five lock states described above to support eight processors, with queueing of processors waiting on a lock, the number of states would increase substantially. For example, there would then states such as "locked by P1, P2 waiting on P1, P3 waiting on P2, P4 waiting on P3" (such a state will hereinafter be expressed by the notation P4→P3→P2→P1), and the total number of states would be the unlocked state, plus locked by any one of the eight processors, plus locked by any one of the eight processors and any one of the remaining seven processors waiting, etc., and would be calculated by:

$$1 + 8 + 8 \cdot 7 + 8 \cdot 7 \cdot 6 + \ldots + 8 \cdot 7 \cdot 6 \cdot 5 \cdot 4 \cdot 3 \cdot 2 \cdot 1 = 109{,}601.$$

Thus, the combinational explosion of lock states makes a straight forward table-driven locking/synchronization facility impractical for applications such as the one illustrated by the above example, and practical only for the simplest kinds of locking/synchronization facilities.

SUMMARY OF THE INVENTION

It is therefore an object of the present invention to provide a locking/synchronization facility which utilizes a transition table of locking state changes, but in which the size of the required transition table is substantially reduced.

It is a further object of the invention to provide a general locking/synchronization facility which is easily adaptable to a wide variety of specific implementations.

Briefly, these and other objects of the present invention are achieved by employing a transition table in which the locking states are stored as canonical states identified in terms of canonical processors. To identify a particular one of the actual locking states, it is then necessary to then map the canonical processors to physical processors in a canonical-actual map (CAM). When a request is received from a processor which will result in a change in the actual locking state, the change can be reflected by changing the canonical state and/or the CAM. This latter change may be made by way of a canonical-canonical map (CCM).

In the method according to this invention, the lock states are decomposed into canonical states and canonical-actual maps, and actual processors are mapped to canonical processors. The present canonical state, canonical processor ID and request are used to look up in a transition table a new canonical state, notify bits and a canonical-canonical map. The canonical-actual map is then permuted using the canonical-canonical map, and the notify bits are permuted using the original canonical-actual map. Using these techniques, logic has been designed for implementing synchronization instructions for multiprocessors. With the exception of the notify lines, the instructions could be used in a manner similar to compare-and-swap or other read/modify/write instructions; however, the instructions are superior for synchronization purposes since they directly implement synchronization primitives.

The use of canonical states in the transition table substantially reduces the number of entries which must be maintained in the transition table, and the number of entries can be further reduced by removing "do-nothing" transitions (e.g., unlocking a lock that is already unlocked), or infrequently used transitions, from the transition table.

The invention can be implemented in either software or hardware and can be easily adapted to a wide variety of locking/synchronization systems.

BRIEF DESCRIPTION OF THE DRAWINGS

The invention will be more clearly understood from the following description in conjunction with the accompanying drawings, wherein:

FIG. 1 is a list of 31 canonical states in a four-processor, three-request system according to one example of the present invention;

FIGS. 2A-2C are examples of various transition table values and maps for explaining the operation of the present invention;

FIGS. 3A-3D are illustrations of examples of data formats which may be used in the present invention;

FIG. 4 is an overall block diagram of essential portions of synchronization instruction logic for implementing the present invention;

FIG. 5 is a more detailed schematic diagram of the actual→canonical conversion circuitry in FIG. 4;

FIG. 6 is a more detailed diagram of the CAM permutation circuitry of FIG. 4; and FIG. 7 is a more detailed illustration of the notify vector permutation circuitry in FIG. 4.

DETAILED DESCRIPTION OF THE PREFERRED EMBODIMENT

The present invention provides a solution to the combinational explosion problem of prior art transition tables by using the concepts of canonical states and canonical-actual maps, and these concepts will be first briefly explained.

In the eight-processor example described above, note that all of the 8! states in which one processor holds the lock and seven processors are queued "look" the same: some processor, e.g., processor A, holds the lock; some other processor, e.g., processor B, is waiting on processor A; some other processor, e.g., processor C, is waiting on processor B; etc. A, B, C, ..., will be hereinafter referred to as "canonical processors", and be thought of as variables that can assume the values P1, P2, ..., Pk. Thus, all of the 8! states can be represented as a single canonical state CS:

$$H \to G \to F \to E \to D \to C \to B \to A,$$

and any particular "actual" state can be represented as a combination of the canonical state CS and a canonical-actual map (CAM). For example, for an actual state:

$$P6 \to P2 \to P8 \to P5 \to P4 \to P1 \to P7 \to P3,$$

the (CS, CAM) combination would be:

$$H \to G \to F \to E \to D \to C \to B \to A,$$
$$(A,B,C,D,E,F,G,H) \to (P3,P7,P1,P4,P5,P8,P2,P6).$$

By representing the lock states as (CS, CAM) pairs, and by encoding the transition table in terms of canonical states and canonical processors, the number of lock states that must appear in the transition table for this example can be decreased from 109,601 to 9, i.e., the unlocked state plus a locked state with 0 through 7 of the processors waiting. The total number of entries in the transition table would be 9·2·8=144, i.e., (9 canonical states)×(2 possible requests—lock or unlock)×(any one of 8 possible processors making the request). However, some additional information is now necessary in the transition table, as will now be described.

Let the canonical states be: unlocked, locked-by-A, B→A, C→B→A, etc., and assume a given lock is in an actual state defined by:

$$C \to B \to A, (A,B,C) \to (P2,P3,P1),$$

and an unlock request is received from Processor 2. The new canonical state should then be:

$$B \to A, (A,B) \to (P3,P1).$$

The new canonical state B→A should appear in the transition table, and the change in the canonical-actual map can be encoded in the transition table as a "canonical-canonical map" (CCM). In this example, the CCM would be:

$$(A,B) \to (B,C).$$

The meaning of this CCM is that, in the new lock state, canonical Processor A should map to the actual processor that was previously mapped to by canonical Processor B, and canonical Processor B should map to the actual processor that was previously mapped to by the canonical Processor C. Thus, in this example, when the actual lock state is P1→P3→P2 and P2 provides an unlock request, the CCM changes the CAM mapping to effectively advance the waiting processors by one position in the queue.

Note that in the lock state:

$$C \rightarrow B \rightarrow A, (A,B,C,) \rightarrow (P2,P3,P1),$$

the remainder of the CAM has been omitted since it "doesn't matter." From a practical standpoint, however, it is convenient to constrain all canonical-actual maps to be full permutations of all processors (this implies that all canonical-canonical maps appearing in the transition table must be full permutations of all canonical processors). Thus, given the lock state above, if a lock request is received from, e.g., P5, and then in the remainder of the CAM it happens that F maps to P5, then a transition table entry for a lock request from canonical Processor F and canonical state $C \rightarrow B \rightarrow A$ of:

$$D \rightarrow C \rightarrow B \rightarrow A, (A,B,C,D) \rightarrow (A,B,C,F)$$

(with the remainder of the CCM being any permutation of the remaining canonical processors) always gives the correct result, and similarly for other cases.

Thus, it can be seen that each transition table entry includes a new canonical state CSi and a canonical-canonical map CCM. The technique of using canonical states and canonical-actual maps is applicable to any facility in which the facility "looks the same" to all processors, i.e., any facility in which there are no preferred processors.

A detailed implementation of one example of the present invention will now be described. The canonical states are CS1, CS2, CS3, ..., CSs, the canonical processors are CP1, CP2, CP3, ..., CPp, CAM and CAM' are canonical-actual maps, CCM is a canonical-canonical map, actual lock states are represented as (CSi, CAM) pairs, and the transition table includes an entry for every (CSi, Rj, CPk) triple. The locking/synchronization facility according to the present invention may then operate as follows:
1. A request Rj against lock L is received from actual processor Pk.
2. The present actual state of lock L is looked-up and determined, e.g., as (CSi, CAM).
3. Let CPk' be the canonical processor with CAM[CPk']=Pk. In other words, the canonical-actual map is examined to determine which canonical processor CPk' is currently mapped to the requesting actual processor Pk.
4. Look up T[i,j,k'], e.g., (CSi', CCM). In this step, the system, having determined in Step 3 the canonical processor making the request, determines the new canonical state CSi' and a canonical-canonical map CCM which, when applied to the previous CAM, will result in the new CAM'.
5. For $1 \leq k'' \leq p$, set CAM'[CPk'']=CAM[CCM[CPk'']]. By this step, the mapping of each canonical processor CPk'' in the original CAM is transformed by the CCM to obtain the new mapping CAM'[CPk''] for each processor.
6. Having now obtained both the new canonical state CSi' and the new canonical-actual map CAM', the state of the lock L is set to (CSi', CAM').
7. For $1 \leq k'' \leq p$, if N[i,j,k'][k''] send (L, CSi', CAM') to CAM[CPK'']. In other words, for each canonical processor CPk'', if the k'' portion of the notify vector N[i,j,k'] is true, the new lock state information is sent to the processor mapped to by CPls'' in the original canonical-actual map.

A specific example of the method of the present invention will now be described. FIG. 1 shows 31 canonical states CS0-CS30 for a four-processor system. In this particular example, the locking/synchronization facility provides both exclusive and shared lock states, and the three available requests Rj are R1=unlock, R2=lock-exclusive, and R3=lock-share. In the notation of FIG. 1, UL designates an unlocked state, A-D designate canonical processors, X designates an exclusive lock and S designates a shared lock. The design of the set of canonical states for other cases, e.g., a different number of processors or different types of lock states, would be a straight forward matter for the ordinarily skilled artisan.

Assume that the present lock state is "share-locked by P4 with P1 waiting exclusive access and with P3 then waiting for share access". In such a case, the canonical state CSi would be given by CS12 in FIG. 1, with the canonical-actual map being given by (A, B, C, D)→(P4, P1, P3, P2). In steps 1 and 2 described above, the unlock request R1 against lock L is received from actual processor P4, and the present state of lock L is looked up in memory. In this case, the current state of lock L may be as shown in FIG. 2A with the CSi segment of the synchronization word indicating CS12 and the CAM segment of the synchronization word indicating the mapping of (A, B, C, D)→(P4, P1, P3, P2).

In Step 3, it is determined from the CAM segment of the synchronization word in FIG. 2A that CAM[CPk']=P4 only for CPk'=A, so that the requesting processor is identified as the canonical processor A.

In Step 4, the transition information T[i,j,k'] will be determined from the transition table and will be expressed as (CSi', CCM). In this example, T[i,j,k'] will be as shown in FIG. 2B, with the CSi segment of the transition word indicating CSi'=CS4 and the CCM segment of the transition word indicating a mapping of (A, B, C, D)→(B, C, A, D).

In Step 5, the new CAM mapping for each processor is determined. For the sake of simplicity, the canonical processors are referred to in this description as processors A-D, although it should be appreciated that these processors will be designated by a numerical index k'' in software. Accordingly, in Step 5, the index k'' will be 0, 1, 2, 3 corresponding to canonical processors A, B, C, D, respectively.

In any event, in Step 5, the calculations for processor A=CP0 are: from the CCM segment of the transition word in FIG. 2B, CCM[CP0]=B; and from the CAM segment of the synchronization word in FIG. 2A, CAM[B]=1. Thus, CAM'[CP0]=CAM[CCM[CP0]]=1. For processor B=CP1: CCM[CP1]=C, CAM[C]=3, so that CAM'[CP1]=CAM[CCM[CP1]]=3. For processor C=CP2: CAM'[CP2]=CAM[CCM[CP2]]=4. For processor D=CP3: CAM'[CP3]=CAM[CCM[CP3]]=2. FIG.

2C illustrates a new synchronization word expressing the new lock state (CSi', CAM').

In Step 6, the state of lock A is set in accordance with the synchronization word shown in FIG. 2C.

In Step 7, the new lock state information is sent to each processor in accordance with the notify vector. For example, for a notify vector of N[i,j,k']=[1100], the new lock state information will be sent to canonical processors A and B in accordance with the previous CAM, i.e., to actual processors P4 and P1.

Although the locking/synchronization facility of the present invention may be easily implemented in software, a simple hardware example will now be explained with reference to FIGS. 3–7 and in the context of the same example above, i.e., a four-processor system having three request possibilities and the 31 lock states shown in FIG. 1, with the current canonical state being CS12 and an unlock request being received from actual processor P4.

FIG. 3A illustrates the format of a synchronization word which can be used for this example, with the bit positions 3–7 designating the canonical state CSi. The CAM segment of the synchronization word comprises two bit positions for each of the canonical processors. In Steps 1 and 2 above, the R1 unlock request is received from processor P4, and the synchronization word information shown in FIG. 2A will be obtained in the format of the synchronization word shown in FIG. 3A. This will result in a synchronization word as shown in FIG. 3B.

The request R1=01, processor ID P4=11 and synchronization word of FIG. 3B are provided to synchronization instruction logic 10 in FIG. 4, with the processor ID and the CAM portion of the synchronization word being provided as inputs to an actual→canonical converter 12 shown in more detail in FIG. 5. In the example shown in FIG. 5, the actual→canonical converter comprises a plurality of Exclusive-NOR(XNOR) gates 14 followed by a plurality of NAND gates 16. The first and second bits, $P_H$ and $P_L$, respectively, of the processor ID code are provided as one input to alternate ones of the XNOR gates 14 with the other input to each of the gates 14 being provided by the first bit, e.g., $M_{2H}$, or the second bit, e.g., $M_{2L}$, and appropriate portion of the CAM segment of the synchronization word in FIG. 3B. In the notation of FIG. 5, inputs $M_{2H}$, $M_{2L}$, $M_{3H}$, $M_{3L}$, $M_{4H}$ and $M_{4L}$ correspond to bit positions 10–15 in FIG. 3A. For an actual processor ID P4=11 and for the synchronization word data in FIG. 3B, the output of the actual→canonical converter shown in FIG. 5 will be ($P'_H$, $P'_L$) =00 indicating that the requesting processor P4 corresponds to the canonical processor 00, i.e., the canonical processor A. This output of the converter circuitry 12 represents the variable CPk'.

Referring again to FIG. 4, the request code R1=01 is provided as part of the address input to a Read Only Memory (ROM) 17, together with the five-bit representation of the current canonical state CSi and the two-bit representation CPk'=00 from the converter 12. The ROM 17 stores the transition table information which will give the notify vector N[i,j,k'], new state CSi' and canonical-canonical map CCM corresponding to each input address combination. The ROM 17 thus performs Step 4 in the process of this invention. In the example above, the 8-bit CCM port of the ROM output will be as shown in FIG. 3C.

Step 5 in the process of this invention is performed by the CAM permutation circuitry 18, one example of which is illustrated in more detail in FIG. 6. For each canonical processor value, the permutation circuitry 18 calculates CAM[CCM[CPk"]], and this CAM permutation can be readily achieved by a plurality of 4:1 multiplexers 20 as shown in FIG. 6. Once again, in the notation of FIG. 6, the signals $M_{1H}$–$M_{4H}$ correspond to bit positions 8, 10, 12 and 14, respectively, in FIG. 3A, and signals $M_{1L}$–$M_{4L}$ correspond to bit positions 9, 11, 13 and 15, respectively, in FIG. 3A. Similarly, signals $C_{1H}$–$C_{4H}$ correspond to bit positions 0, 2, 4 and 6, respectively, in FIG. 3C, while signals $C_{1L}$–$C_{4L}$ correspond to bit positions 1, 3, 5 and 7, respectively, in FIG. 3C. The two-bit selection input to each multiplexer 20 in FIG. 6 determines the particular one of the inputs which will be selected. Since the selection inputs to the top pair of multiplexers correspond to CCM[0], the top pair of multipexers will permute the CAM vector to obtain the two-bits representing CAM'[0]. The second, third and fourth pair of multiplexers will operate in a similar manner to provide the remainder of the CAM' vector.

The lock data (CSi', CAM') will then be provided as a data output to be sent to processors in accordance with the Notify vector provided at the output of the ROM 16. In the example above, the resulting lock data will be as shown in FIG. 3D.

The notify vector provided from the ROM 17 will typically be in the form of a k-bit vector, where k is the number of processors, with a "1" bit value in any position indicating that the canonical processor corresponding to that position should be notified. In the example above, it was assumed that canonical processors A and B should be notified of the transition from CS12 to CS4. In order to notify the appropriate processors, the CAM must be consulted to determine which actual processors correspond to the canonical processors A and B to be notified, and this is accomplished in the notify permutation or mapping circuitry 22 in FIG. 4, which is illustrated in more detail in FIG. 7 as including a plurality of demultiplexors 24 and OR gate 26. Each multiplexor will provide its input to an output in accordance with a two-bit selection signal from the CAM indicating which actual processor is mapped to by that bit of the Notify vector. In the present example, the notify vector will be (1100) indicating that canonical processors A and B are to be notified, and the canonical processors are determined in accordance with the original CAM to be processors P1 and P4. The outputs of the switch will be a NOTIFY' vector (1,0,0,1) indicating that the actual processors P1 and P4 should be provided with the new lock state data.

In Step 7, additional circuitry (not shown) forwards the lock state data (CSi', CAM') to the appropriate actual processors.

Using the techniques of canonical states and canonical-actual maps, it is feasible to implement a wide variety of locking/synchronization facilities as transition tables for a table-driven facility. It is a straight forward matter to develop techniques for generating transition tables for (1) exclusive locks with queueing of waiting processors (the first elementary example described above), (2) facilities in which access authority is passed around a ring of processors, e.g, a facility in which the only lock state is "lock-by-A" and the mapping to the canonical processor A is successively passed around a ring, (3) shared/exclusive locks, with queueing of waiting processors in a series-parallel graph structure, as described above with reference to FIG. 1, and (4) limited-lock-facility-style locks, e.g., as described by S. Behman et al, "Limited Lock Facility in a DASD Control Unit", IBM Technical Report TR 0.2859, GPD San Jose, Oct. 15, 1979. The size of the transition table for each case, in terms of the number of transitions, is (1): $(p+1) \cdot 2 \cdot p$, (2): $1 \cdot 1 \cdot p$, (3): $(2^{p+1}-1) \cdot 3 \cdot p$, and (4): $(p+2) \cdot 2 \cdot p$, where p is the number of processors. Note that in case (3), the number of lock states increases exponentially, and this is due to the increase in complexity of the "wait-for" graph. However, even for case (3), the technique according to this invention is suitable for on the order of eight or fewer processors.

Furthermore, additional transition table size reduction is possible by removing "do-nothing" transitions (e.g., unlocking a lock that is already unlocked), or infrequently used transitions, from the transition table in various straight forward ways.

Finally, it is often the case that locking/synchronization facilities maintain information only for locks or synchronization entities that are currently in use. Such space management can be interfaced to the table-driven facility described herein by identifying one canonical state as a special "not-in-use" state. For example, in the limited lock facility there are two canonical states for an unlocked lock: unlocked and unlocked-pending. Only the former state would be considered the special "not-in-use" state.

It should be appreciated that a number of modifications could be made to the embodiment disclosed herein without departing from the spirit and scope of the invention as defined in the appended claims.

Having thus described my invention, what I claim as new, and desire to secure by Letters Patent is:

1. A multiprocessor system, of the type comprising:
   a common resource;
   a plurality of actual processors for sharing said common resource;
   means associated with each processor for generating a request; and
   means responsive to said requests for maintaining a lock for controlling access by said plurality of actual processors to said common resource, said lock having a plurality of possible actual lock states corresponding to respective relationships between said plurality of actual processors, said lock means including transition table means for storing lock state transition information including a plurality of first canonical lock states and requests and a second lock canonical state which will result for a given combination of first canonical lock state and request, said first and second canonical lock states corresponding to respective relationships between canonical processors, whereby each canonical lock state represents a plurality of different actual lock states, said transition table means including actual-canonical conversion means for receiving a processor identification code designating the source of a received request and for converting said processor identification code in accordance with the mapping of canonical processors to actual processors in order to obtain a canonical processor identification code CPk', said system further comprising mapping means for mapping canonical processors in said transition table to actual processors.

2. A system as defined in claim 1, wherein said transition table means further comprises means for providing a new canonical state vector CSi' in accordance with an address input formed of a combination of a request identification code Rj designating a particular received request, an original state vector CSi representing the state of said lock upon receiving said request, and said canonical processor ID code CPk'.

3. A system as defined in claim 2, further comprising means for generating a permutation vector COM in accordance with said address input, said transition table means further comprising map conversion means for converting said mapping of canonical processors to actual processors to a new mapping of canonical processors to actual processors in accordance with said permutation vector COM.

4. A system as defined in claim 2, further comprising means responsive to said address input for generating a notify vector designating the canonical processors to be notified of said second lock state, said transition table means further comprising mapping means responsive to said notify vector and to said canonical-actual map for generating an output signal representing the physical processors to be notified.

5. A method of controlling access to a common resource by a plurality of actual processors in a multiprocessor system, said method comprising the steps of: in accordance with requests generated by said actual processors, maintaining a lock for controlling access by said plurality of actual processors to said common resource, said lock having a plurality of possible actual lock states corresponding to respective relationships between said plurality of actual processors, and permitting access to said shared resource in accordance with a present actual state of said lock, said step of maintaining said lock comprising:
   generating and storing a transition table of state transition information including a plurality of first canonical lock states and requests and a second lock canonical state which will result for a given combination of first canonical lock state and request, said first and second canonical lock states corresponding to respective relationships between canonical processors, whereby each canonical lock state represents a plurality of different actual lock states; and
   generating a mapping table in accordance with said requests and storing said mapping table, said mapping table indicating correspondence between canonical processors in said transition table and actual processors, said step of generating said mapping table comprising the steps of generating a first map indicating the correspondence between said canonical processors and said actual processors when said lock is in a first state, generating a conversion map indicating the correspondence between canonical processors in a first canonical lock state and canonical processors in a second canonical lock state in accordance with said given combination, and changing said first map to a new map indicating the correspondence between canonical processors and actual processors in accordance with said conversion map.

6. A method as defined in claim 5, further comprising the steps of
   generating a notify vector representing canonical processors to be notified of a transition from a first state to a second state; and
   combining said notify vector and said first map to determine the actual processors to be notified.

7. A method of controlling access to a common resource by a plurality of actual processors Pk in a multiprocessor system, said method comprising the steps of maintaining a lock L having a plurality of possible actual lock states corresponding to respective relationships between said plurality of actual processors, and permitting access to said shared resource in response to requests Rj from said processors and in accordance with a current actual state of said lock, said step of maintaining a lock comprising: maintaining a transition table of lock state transition information including a plurality of first canonical lock states and requests and a second lock canonical state which will result for a given combination of first canonical lock state and request, said first and second canonical lock states corresponding to respective relationships between canonical processors, whereby each canonical lock state represents a plurality of different actual lock states; and generating a mapping table in accordance with said requests and storing said mapping table, said mapping table indicating correspondence between canonical processors in said transition table and actual processors, said method including the steps of:

receiving a request Rj against said lock L from a processor Pk;

determining the current state (CSi, CAM) of said lock L, where CSi represents a canonical lock state in which one of said first actual lock states is represented in terms of canonical processors, and CAM is a first canonical-actual map indicating the correspondence between canonical and actual processors;

generating a canonical processor identification code CPk' defined by CAM(CPk')=Pk;

determining a transition table vector T(i,j,k')=(CSi', CCM), wherein CSi' represents a second canonical state and CCM represents a canonical-canonical map indicating changes to be made to said canonical-actual map associated with transition from a first actual lock state to a second actual lock state;

generating a new canonical-actual map CAM' in accordance with a combination of said first canonical-actual map and said canonical-canonical map; and setting the state of said lock L to a second lock state given by (CSi', CAM').

8. A method as defined in claim 7, further comprising the step of generating a canonical notify vector representing the canonical processors to be notified of a transition from a first state to a second state; converting said canonical notify vector to an actual notify vector in accordance with said first canonical-actual; and notifying selected processors in accordance with said actual notify vector.

* * * * *